US012405443B2

United States Patent
Larson et al.

(10) Patent No.: US 12,405,443 B2
(45) Date of Patent: Sep. 2, 2025

(54) INTERIOR REARVIEW MIRROR ASSEMBLY WITH OVERMOLDED METAL MOUNT AND ANTI-CAMOUT TAB

(71) Applicant: Magna Mirrors of America, Inc., Holland, MI (US)

(72) Inventors: Kurtis M. Larson, Grand Haven, MI (US); Matthew V. Steffes, Grand Rapids, MI (US); John T. Uken, Jenison, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 723 days.

(21) Appl. No.: 17/659,849

(22) Filed: Apr. 20, 2022

(65) Prior Publication Data
US 2022/0334348 A1   Oct. 20, 2022

Related U.S. Application Data

(60) Provisional application No. 63/201,236, filed on Apr. 20, 2021.

(51) Int. Cl.
*G02B 7/182* (2021.01)
*B60R 1/04* (2006.01)

(52) U.S. Cl.
CPC ................ *G02B 7/182* (2013.01); *B60R 1/04* (2013.01)

(58) Field of Classification Search
CPC .................................. G02B 7/182; B60R 1/04
USPC ........................................................ 359/872
See application file for complete search history.

(56) References Cited

U.S. PATENT DOCUMENTS

| 3,928,894 | A | | 12/1975 | Bury et al. |
| 4,158,981 | A | * | 6/1979 | Kurosaki ............... G10G 5/00 84/421 |
| 4,826,289 | A | | 5/1989 | Vandenbrink et al. |
| 4,936,533 | A | | 6/1990 | Adams et al. |
| 5,100,095 | A | | 3/1992 | Haan et al. |
| 5,327,288 | A | | 7/1994 | Wellington |
| 5,377,948 | A | | 1/1995 | Suman et al. |
| 5,820,097 | A | | 10/1998 | Spooner |

(Continued)

FOREIGN PATENT DOCUMENTS

| DE | 10060447 A1 | 6/2002 |
| DE | 10256835 A1 | 6/2004 |

(Continued)

*Primary Examiner* — Bumsuk Won
*Assistant Examiner* — Rahman Abdur
(74) *Attorney, Agent, or Firm* — HONIGMAN LLP

(57) ABSTRACT

A vehicular interior rearview mirror assembly includes a mirror head and a mounting assembly having a mirror mount and a mounting arm, which is configured to attach at an interior portion of a vehicle. The mirror head includes a mirror reflective element. The mounting arm is attached to the mirror head and the mounting arm is pivotally attached at the mirror mount via a first pivot joint. The mirror mount includes an anti-camout element protruding from an interior surface of a socket element of the first pivot joint and at least partially received in a recess of a ball member of the first pivot joint to limit pivotal movement of the ball member when the ball member engages the anti-camout element. The mirror mount comprises a metallic support element forming at least a portion of the anti-camout element.

14 Claims, 13 Drawing Sheets

(56) References Cited

U.S. PATENT DOCUMENTS

| | | |
|---|---|---|
| 5,931,440 A | 8/1999 | Miller |
| 6,042,076 A | 3/2000 | Moreno |
| 6,318,870 B1 | 11/2001 | Spooner et al. |
| 6,329,925 B1 | 12/2001 | Skiver et al. |
| 6,439,755 B1 | 8/2002 | Fant, Jr. et al. |
| 6,483,438 B2 | 11/2002 | DeLine et al. |
| 6,501,387 B2 | 12/2002 | Skiver et al. |
| 6,540,193 B1 | 4/2003 | DeLine |
| 6,593,565 B2 | 7/2003 | Heslin et al. |
| 6,690,268 B2 | 2/2004 | Schofield et al. |
| 6,824,281 B2 | 11/2004 | Schofield et al. |
| 6,877,709 B2 | 4/2005 | March et al. |
| 7,184,190 B2 | 2/2007 | McCabe et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,626,749 B2 | 12/2009 | Baur et al. |
| 7,712,810 B2 | 5/2010 | Tanaka et al. |
| 7,855,755 B2 | 12/2010 | Weller et al. |
| 8,049,640 B2 | 11/2011 | Uken et al. |
| 8,277,059 B2 | 10/2012 | McCabe et al. |
| 8,451,332 B2 | 5/2013 | Rawlings |
| 8,508,831 B2 | 8/2013 | De Wind et al. |
| 8,529,108 B2 | 9/2013 | Uken et al. |
| 8,730,553 B2 | 5/2014 | De Wind et al. |
| 8,851,690 B2 | 10/2014 | Uken et al. |
| 9,156,403 B2 | 10/2015 | Rawlings et al. |
| 9,174,577 B2 | 11/2015 | Busscher et al. |
| 9,174,578 B2 | 11/2015 | Uken et al. |
| 9,333,916 B2 | 5/2016 | Uken et al. |
| 9,346,403 B2 | 5/2016 | Uken et al. |
| 9,475,431 B2 | 10/2016 | Brummel et al. |
| 9,598,016 B2 | 3/2017 | Blank et al. |
| 9,827,913 B2 | 11/2017 | De Wind et al. |
| 10,144,353 B2 | 12/2018 | Karner et al. |
| 10,538,201 B2 | 1/2020 | De Wind et al. |
| 10,744,944 B2 | 8/2020 | Steffes |
| 2004/0079853 A1 | 4/2004 | Suzuki et al. |
| 2005/0164541 A1 | 7/2005 | Joy et al. |
| 2006/0061008 A1 | 3/2006 | Karner et al. |
| 2009/0096235 A1 | 4/2009 | Tanaka et al. |
| 2013/0062497 A1 | 3/2013 | Van Huis et al. |
| 2013/0112836 A1* | 5/2013 | Rawlings ............... B60R 1/04 248/484 |
| 2014/0022390 A1 | 1/2014 | Blank et al. |
| 2014/0226012 A1 | 8/2014 | Achenbach |
| 2014/0293169 A1 | 10/2014 | Uken et al. |
| 2015/0097955 A1 | 4/2015 | De Wind et al. |
| 2015/0251605 A1 | 9/2015 | Uken et al. |
| 2015/0334354 A1 | 11/2015 | Uken et al. |
| 2018/0297526 A1 | 10/2018 | Hennig et al. |
| 2020/0269760 A1* | 8/2020 | De Wind ............. B60R 1/086 |

FOREIGN PATENT DOCUMENTS

| | | |
|---|---|---|
| DE | 102008011871 A1 | 9/2009 |
| DE | 102010010571 A1 | 9/2011 |

* cited by examiner

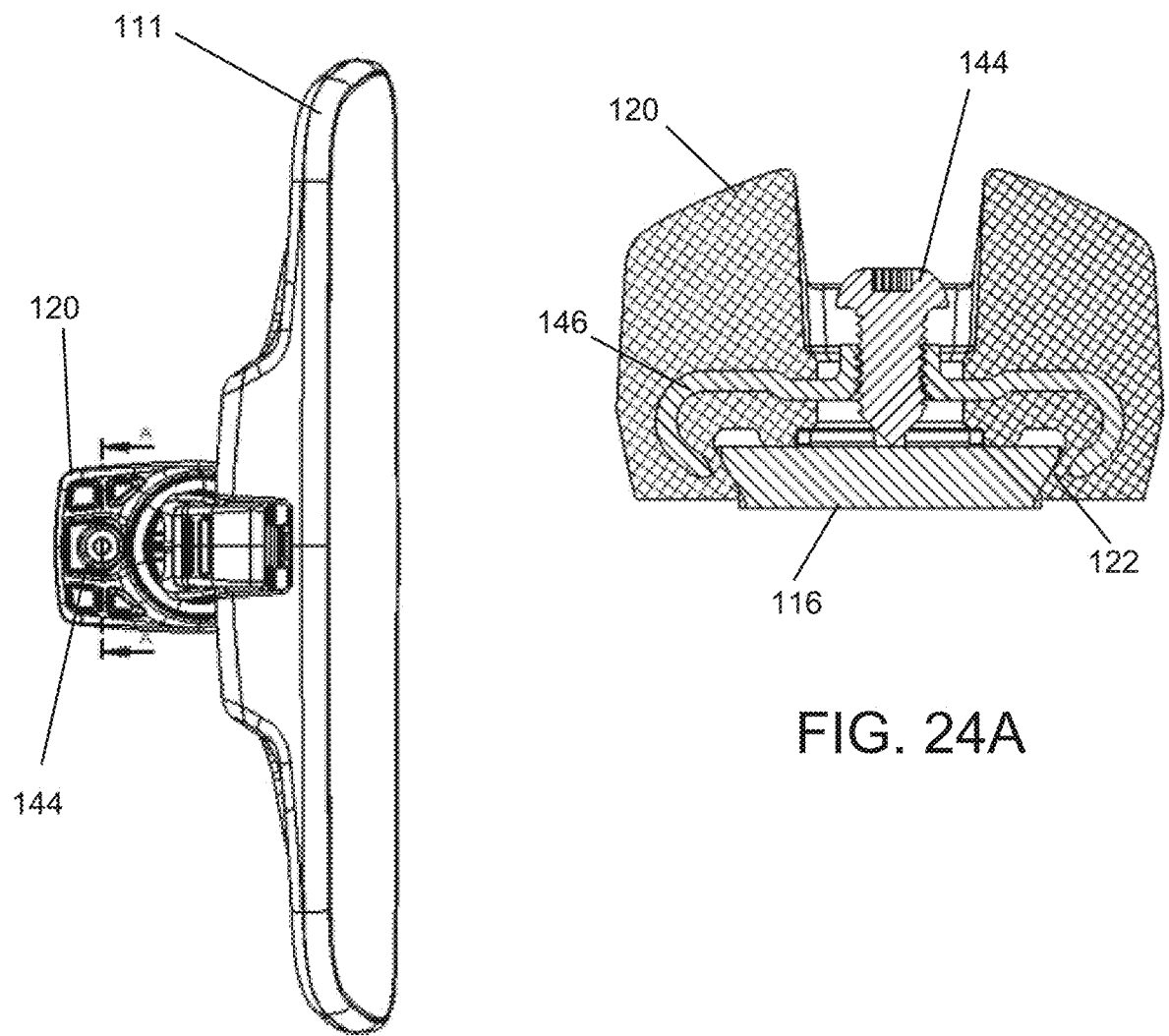

US 12,405,443 B2

INTERIOR REARVIEW MIRROR ASSEMBLY WITH OVERMOLDED METAL MOUNT AND ANTI-CAMOUT TAB

CROSS REFERENCE TO RELATED APPLICATION

The present application claims the filing benefits of U.S. provisional application Ser. No. 63/201,236, filed Apr. 20, 2021, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

An interior rearview mirror assembly is configured to mount at an interior portion of a vehicle via a mounting arm attached at a mirror head of the mirror assembly and pivotally attached to a socket base or mirror mount. The mounting arm is pivotally attached at the mirror mount via a ball member of the mounting arm received within a socket of the mirror mount. An anti-camout tab protrudes from an interior surface of the socket and is at least partially received within a recess of the ball member. The anti-camout tab prevents the ball member from rotating within the socket beyond a point where the ball member engages the anti-camout tab. A metallic support structure at the mirror mount provides at least a portion of the anti-camout tab to provide increased strength and durability to the plastic material of the mirror mount.

A vehicular interior rearview mirror assembly includes a mounting assembly including a mirror mount and a mounting arm. The mirror mount is configured to attach at an interior portion of a vehicle equipped with the vehicular interior rearview mirror assembly. A mirror head includes a mirror reflective element. The mirror head is pivotally mounted at the mounting arm and the mounting arm is pivotally attached at the mirror mount. The mounting arm is pivotally attached at the mirror mount via a pivot joint that includes a ball member of the mounting arm received in a socket element of the mirror mount. The mirror mount includes an anti-camout element protruding from an interior surface of the socket element and that is at least partially received in a recess of the ball member to limit rotation of the ball member within the socket element beyond where the ball member engages the anti-camout element. The mirror mount includes a metallic support element forming at least a portion of the anti-camout element.

These and other objects, advantages, purposes and features of the present invention will become apparent upon review of the following specification in conjunction with the drawings.

BRIEF DESCRIPTION OF THE DRAWINGS

FIG. 24 is a bottom view of the interior rearview mirror assembly of FIGS. 13-15;

FIG. 24A is a cross-sectional view taken along Line A-A of FIG. 24;

DESCRIPTION OF THE PREFERRED EMBODIMENTS

Figure 1:
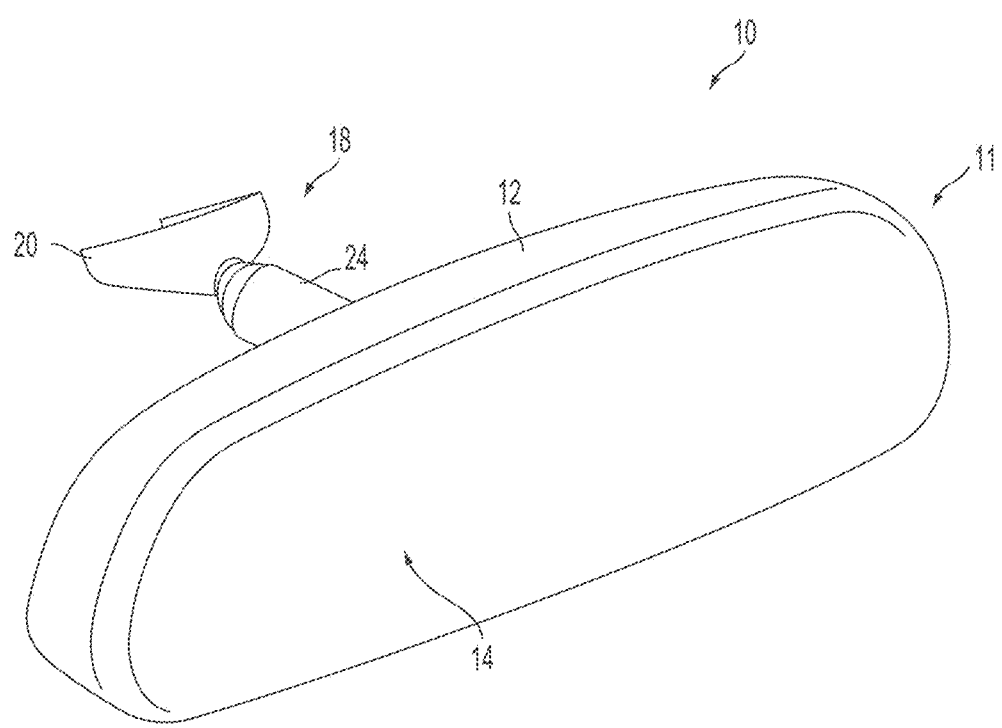
FIG. 1 is a perspective view of an interior rearview mirror assembly.

Referring now to the drawings and the illustrative embodiments depicted therein, an interior rearview mirror assembly 10 for a vehicle includes a mirror head 11 adjustably mounted at a mounting structure or assembly 18 (FIG. 1). The mirror head 11 includes a mirror casing 12 and a reflective element 14 positioned at a front portion of the casing 12. In the illustrated embodiment, the mirror assembly 10 is configured to be adjustably mounted to an interior portion of a vehicle (such as to an interior or in-cabin surface of a vehicle windshield or a headliner of a vehicle or the like) via the mounting structure or mounting configuration or assembly 18. The mirror reflective element 14 comprises a prismatic mirror reflective element that is flipped between a daytime position and a nighttime position via a toggle element 42 that controls a toggle mechanism 38. Optionally, the mirror assembly may have a variable reflectance mirror reflective element that varies its reflectance responsive to electrical current applied to conductive coatings or layers of the reflective element. The mirror mounting assembly 18 includes a socket base or mounting base or mirror mount 20 that is configured to mount at a mounting plate or mirror mounting button 16 attached at an interior portion of the vehicle, such as at a mounting button adhered at the in-cabin side of the vehicle windshield. The mirror mount 20 receives a mounting arm 24 that is attached to the rear of the mirror head 11. The mounting arm 24 includes a ball member 26 pivotally received within a socket 30 of the mirror mount 20 and the mirror mount 20 includes an anti-camout tab or anti-camout element 32 protruding from an inner surface of the socket 30 and within a recess of the ball member 26 to limit pivotal movement of the ball member 26 within the socket 30 to prevent the ball member 26 and mounting arm 24 from pulling out or detaching or releasing from the socket and mirror mount. As described further below, the mirror mount includes a metallic support structure 46 integrally molded with the mirror mount 20 and forming at least a portion of the anti-camout tab 32 to provide added strength and durability to the mirror mount 20.

Figure 2:
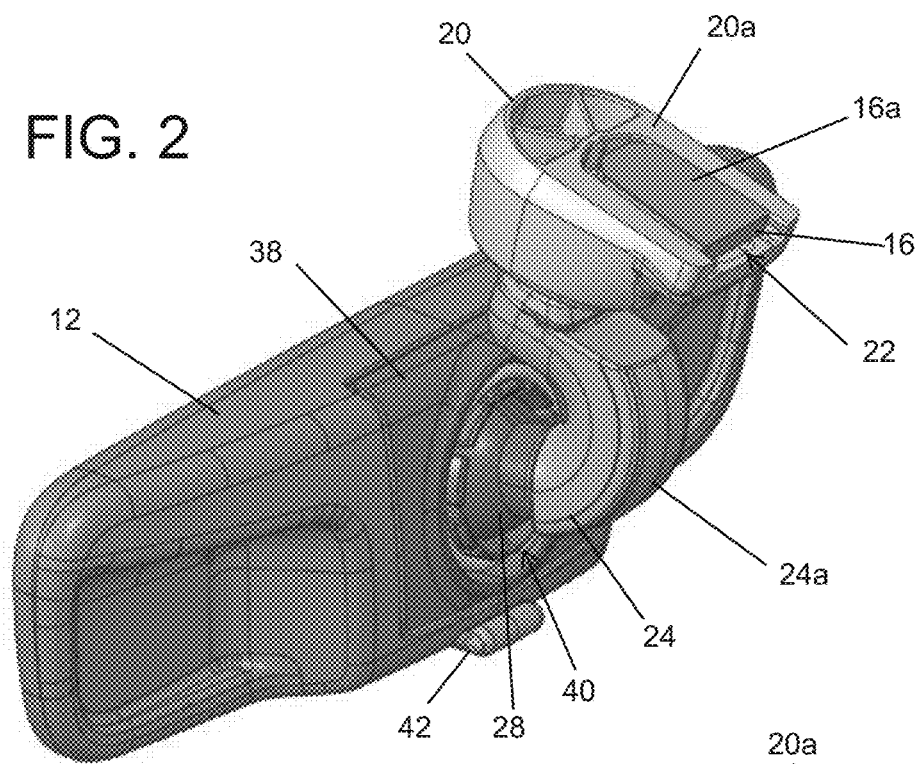
FIG. 2 is a perspective view of an interior rearview mirror assembly with a double pivot joint mounting construction configured to attach at a mirror button for mounting at an interior portion of a vehicle.
Figure 3:
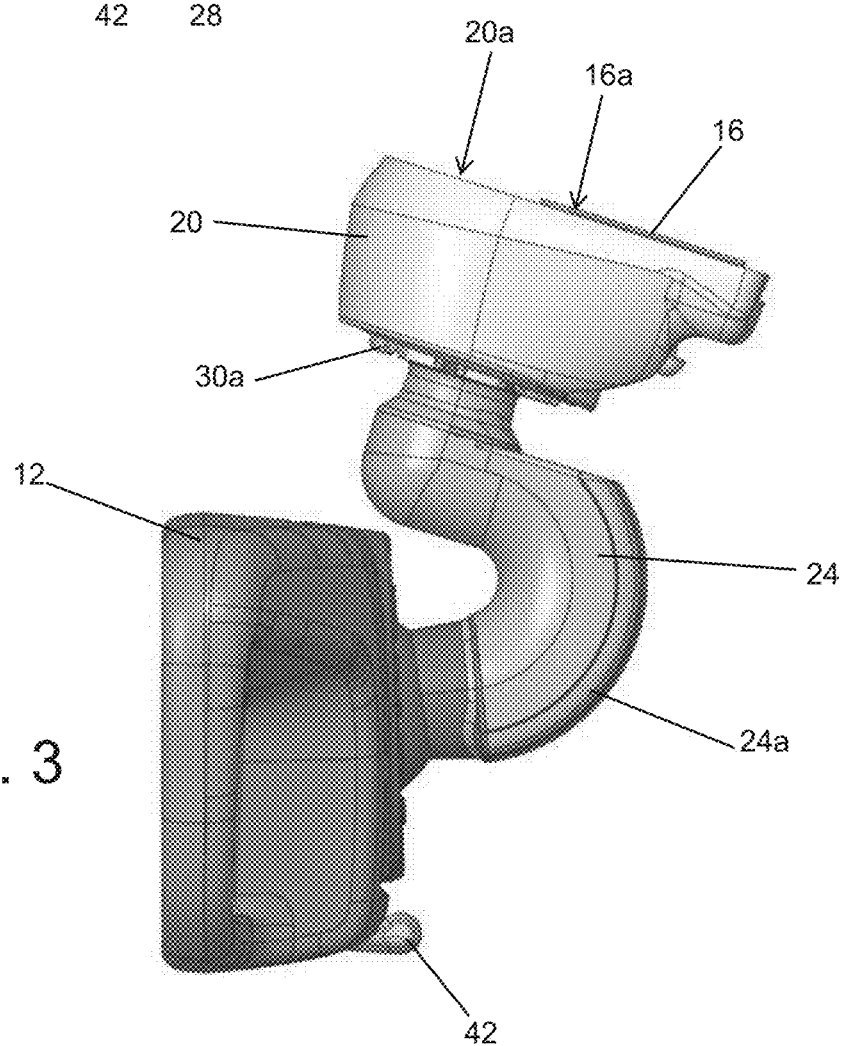
FIG. 3 is a side view of the interior rearview mirror assembly of FIG. 2.

When installed at an in-cabin side of the windshield, the mirror mounting button 16 may be adhesively attached to the windshield and the mirror mount 20 engages the mirror button 16. For example, the mirror mount 20 may snap attach to the mirror button 16 or slidably engage the mirror button 16. In the illustrated embodiment (and with reference to FIGS. 2 and 3), the socket base or mirror mount 20 receives the wedge-shaped mirror mounting button 16 at a button receiving portion 22 of the mirror mount 20. A locking element or set screw 44 engages the mirror button 16 through the mirror mount 20 to retain the mirror mount 20 at the mirror mounting button 16. The mirror mount 20 receives the first ball member 26 of the mounting arm 24 in the socket 30 of the mirror mount 20 and the mounting arm 24 connects to the mirror head 11 via a second ball member 28 received in a socket 40 in the toggle mechanism 38 of the mirror head.

The mounting arm 24 comprises a plastic 2-ball linkage piece that has the first ball member 26 at one end of a longitudinally curved or bent arm portion 24a and the second ball member 28 disposed at the opposite end of the arm portion 24a. The first ball member 26 is pivotally received at the socket 30 of the mirror mount 20 (and retained therein via a coil spring 34 and flexible tabs 30a that define the interior surface of the socket 30). The mounting arm 24 may be fixedly attached at the mirror head 11 or the second ball member 28 at the other end of the arm portion 24a may be pivotally received at the socket 40 of the toggle mechanism 38 of the mirror head 11. The plastic 2-ball linkage mounting arm 24 may comprise a single or unitary piece of plastic (such as made via injection molding of a plastic material). The double ball-pivot joint of the mounting arm 24 allows a user to pivot the mirror reflective element at the junction between the mirror casing and mounting arm and/or at the junction between the mounting arm and the mirror mount. Thus, the mirror reflective element may be pivotable by a user to a number of different configurations so as to provide a desired rearward view to a driver of the vehicle.

The socket 30 receives the first ball member 26 of the mounting arm 24 to provide a first pivot joint for pivoting the mounting arm 24 and mirror head 11 relative to the mirror mount 20. The flexible elements or tabs 30a (that, together with the inner surface 30b of the mirror mount, define the socket 30), during assembly and/or installation of the mounting arm at the mirror mount, flex to allow the ball 26 of the mounting arm 24 to be pressed into the socket 30. As the ball 26 is received within the socket 30, the flexible tabs 30a snap back toward their initial state to retain the ball member 26 in the socket 30. As shown in the illustrated embodiment (and with reference to FIGS. 4-7), the coil spring 34 is inserted into a circular slot 36 surrounding or circumscribing the socket 30 of the mirror mount to provide a constricting or biasing force on an external surface of the flexible tabs 30a to further retain the ball member in the socket. The socket 40 at the toggle mechanism 38 is similarly oriented with flexing tabs and a coil spring for pivotally receiving the second ball member 28 to provide a second pivot joint, and the flexing tabs and/or coil spring at each socket may be selected to provide greater resistance to pivoting at one end of the mounting arm than the other. For example, the mounting arm 24 may have greater resistance to pivoting at the socket 30 of the mirror mount 20 as compared to the resistance to pivoting of the socket 40 of the toggle mechanism and mirror casing at the other end of the mounting arm. The ball members and respective sockets may be formed to resist or limit pivoting within a range of selected or appropriate pivotal movement.

Figure 4:
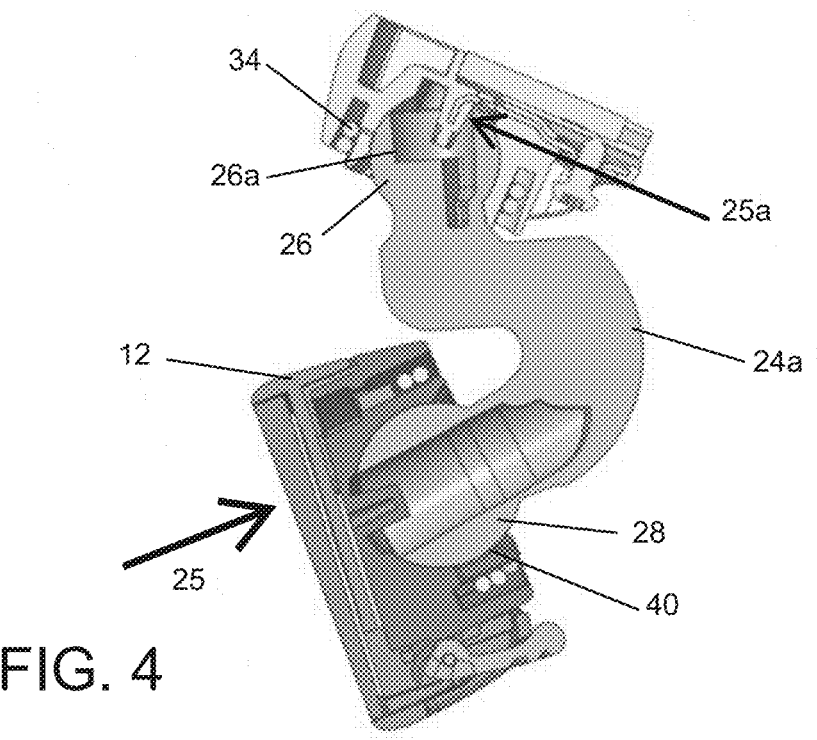
FIG. 4 is a cross-sectional view of the interior rearview mirror assembly of FIG. 2.
Figure 5:
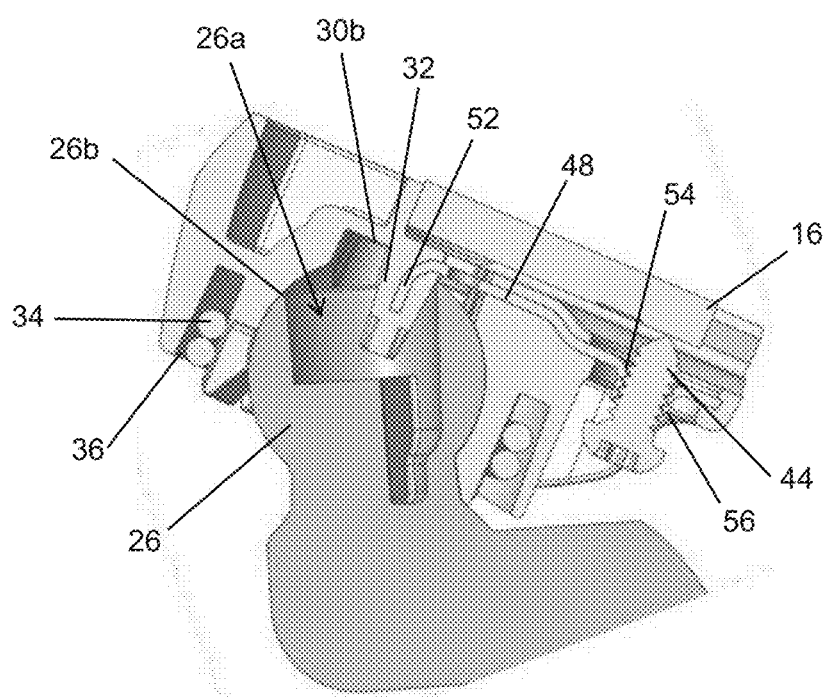
FIG. 5 is a cross-sectional view of the mounting arm and mirror mount of FIG. 2.
Figure 6:
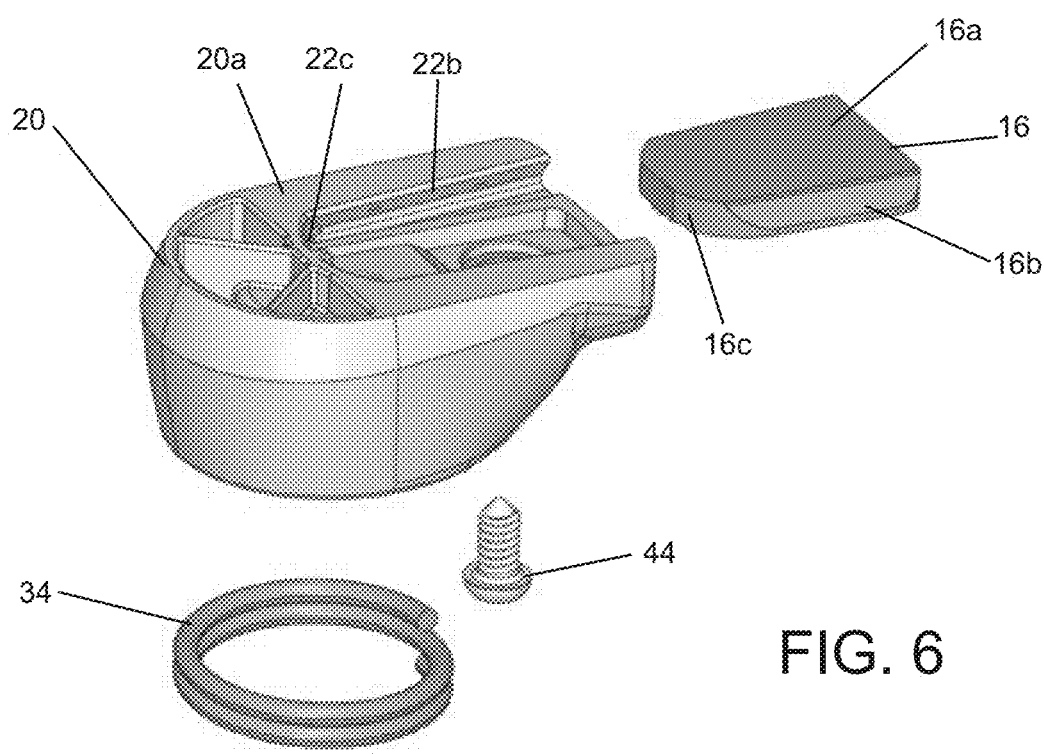
FIG. 6 is an exploded view of the mirror mount and mirror button.
Figure 7:
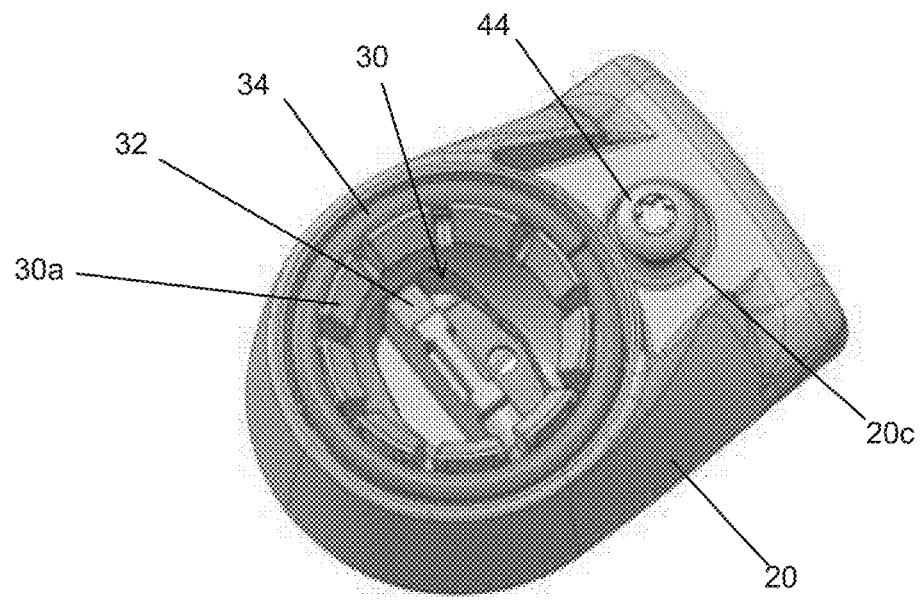
FIG. 7 is a perspective view of the mirror mount of FIG. 6.
Figure 8:
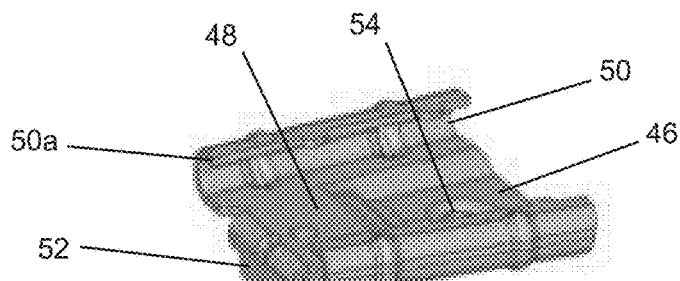
FIG. 8 is a perspective view of a mirror mount and a metallic support structure.
Figure 9:
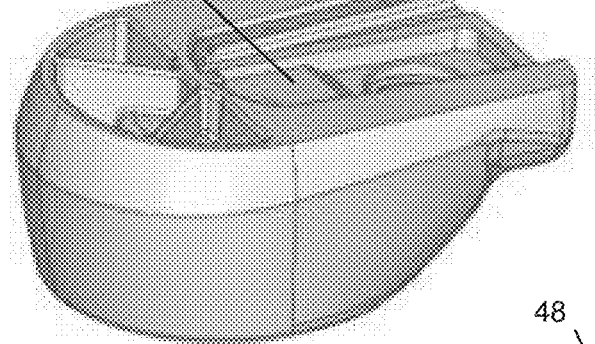
FIG. 9 is a perspective view of the metallic support structure of FIG. 8.
Figure 10:
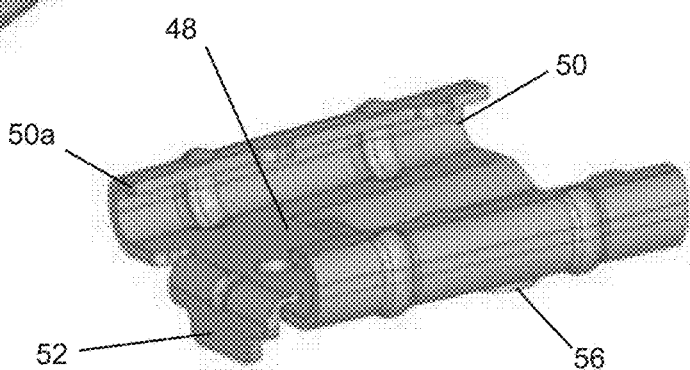
FIG. 10 is a perspective view of the mirror mount overmolded over the metallic support structure.

As shown in FIGS. 4 and 5, the anti-camout element 32 protrudes from an inner surface of the socket 30 so that the anti-camout element 32 is at least partially received within a recess 26a of the first ball member 26 when the first ball member 26 is disposed in the socket 30. The anti-camout element 32 prevents the ball joint from rotating or pivoting beyond a given point where the mounting arm 24 may inadvertently detach or pull out of the socket 30. As will be discussed further below, the plastic mirror mount 20 (formed from such material as a 30 percent glass filled Polyoxymethylene (POM) or acetal or the like) includes a metallic support structure or element or tab 52 that forms at least a portion of the anti-camout element 32 and provides a rigid internal element for the mirror mount 20.

The ball member 26 of the mounting arm 24 includes an interior surface defining the recess 26a in the upper portion of the ball member that is received within the socket 30 of the mirror mount 20. When received in the socket 30, the ball member 26 is free to pivot within the socket (to pivot or position the mirror reflective element as desired by the user), to a degree permitted by the anti-camout tab 32. As the mounting arm 24 is pivoted to position the mirror reflective element at various positions, the interior surface or edge 26b of the ball member recess 26a engages the anti-camout tab 32 to prevent the ball member from pivoting beyond a point where the ball member engages the anti-camout tab. The anti-camout tab 32 is positioned and sized to allow a significant degree of movement of the ball member 26 and therefore of the mounting arm 24 and mirror head and also to limit or preclude the ball member 26 from being rotated or pivoted beyond a point where the ball member could fall or pull out of the socket. For example, if the ball joint is rotated beyond a point so that the edge 26b of the ball member recess 26a is external the socket (or past the edge of the socket), the ball member could pull out of the socket.

In the illustrated embodiment, the anti-camout tab is centrally aligned with a vertical axis of the socket 30 of the mirror mount to provide an equally distributed range of motion for the ball member 26 within the socket. Optionally, the anti-camout tab and/or recess 26a of the ball member may be configured to provide other ranges of motion. For example, the anti-camout tab may be positioned within the socket in such a way as to allow greater range of motion in one direction and a lesser range of motion in the opposite direction. Placing the anti-camout tab further back in the socket (further from the front surface of the mirror reflective element) may allow the mounting arm to pivot further upward (relative to a neutral position) via a ball joint that has a greater corresponding range of motion, but pivot to a lesser degree downward via the ball joints corresponding shorter range of motion.

As the ball member 26 is rotated or pivoted within the socket, the top edge 26b of the recess 26a contacts the outer surface or edge of the anti-camout tab 32 to prevent the ball member from further rotating or pivoting within the socket beyond the point where the edge 26b or inner surface of the recess engages the anti-camout tab 32. If a user attempts to pivot the mirror reflective element beyond the point permitted by the anti-camout tab 32, a force may be exerted through the ball member 26 onto the anti-camout tab 32. For example, see FIG. 4 which depicts a force 25 (represented by an arrow) applied at the mirror reflective element (such as to reposition the mirror reflective element to provide a desired view) and the resulting force 25a applied via the mounting arm 24 and ball member 26 upon the anti-camout tab 32. Over time, repeated forces acting upon the anti-camout tab 32 may bend or degrade or otherwise damage the plastic portion of the tab. Thus, the metallic support structure 46 that forms at least a portion of the anti-camout tab 32 provides additional rigid support to increase the lifespan of the tab.

The metallic support structure 46 is overmolded by the unitary plastic element of the mirror mount 20 and provides rigid support to the various portions of the mirror mount, including the anti-camout tab 32. The tab 52 of the metallic support structure 46 extends along and is overmolded by the plastic anti-camout tab 32 to provide a substantially rigid anti-camout tab that will not bend or break when a force is applied to the mounting arm at a point where the anti-camout tab 32 contacts the ball member to limit or preclude pivoting of the mounting arm past a given orientation relative to the mounting base.

As shown in FIGS. 8-12, the metallic support structure 46 comprises a piece of stamped steel having a substantially flat base portion 48 with curved arms or rails or lateral receiving channels 50 extending along opposite edges of the base portion. The tab 52 extends from one end of the base portion, and the pair of receiving channels 50 are configured to provide support to side walls of the button receiving portion 22 of the mirror mount 20 that receives the sides of the mirror mounting button when the mirror mount is attached at the mounting button at the interior portion of the vehicle (e.g., at the in-cabin side of the vehicle windshield). A threaded through hole 54 in the base portion 48 aligns with a through hole or passageway 20c in the body of the mirror mount 20 and threadably receives the set screw 44 therein (such as within a screw receiving protrusion 56 comprising a threaded inner surface) to retain the support structure 46 at the mirror mounting button.

As discussed above, the support tab 52 protrudes from an end region of the base portion 48 of the support structure 46 and forms at least a portion of the anti-camout tab 32 to provide structural support to the anti-camout tab and resist forces placed on the anti-camout tab from the ball member. Optionally, the support tab 52 may protrude from a lower surface of the support structure 46. The support tab 52 protrudes from the base portion 48 and is substantially perpendicular to the base portion of the support structure. In the illustrated embodiment (such as seen in FIG. 5), the support tab 52 of the support structure 46 is contained or overmolded entirely within the body of the anti-camout tab 32 and provides a rigid core for the anti-camout tab to prevent the anti-camout tab 32 from bending or breaking when excessive or repeated force is applied via pivoting of the ball member 26. Although shown as overmolded with the plastic material of the mirror mount such that the entirety of the support tab is within the body of the anti-camout tab, the support tab of the support structure may provide any portion or the entirety of the anti-camout tab. For example, the support tab 52 is shown as being centrally located within the anti-camout tab 32 (to provide a rigid core of the anti-camout tab), but the support tab may be positioned within the overmolded plastic material of the mirror mount to provide one or more of the outer surfaces of the anti-camout tab. Optionally, the support tab 52 may comprise the entirety of the anti-camout tab 32 such that there is no plastic overmolded onto the metallic support tab. Thus, the mirror assembly includes a tab on the steel support that reinforces the plastic anti-camout feature located in the socket and/or comprises the anti-camout tab of the mirror mount. The steel tab allows higher forces to be applied to the mirror and/or ball joint in its maximum adjustment travel before damaging the plastic feature and prevents the ball from being forced out of the socket.

Figure 11:
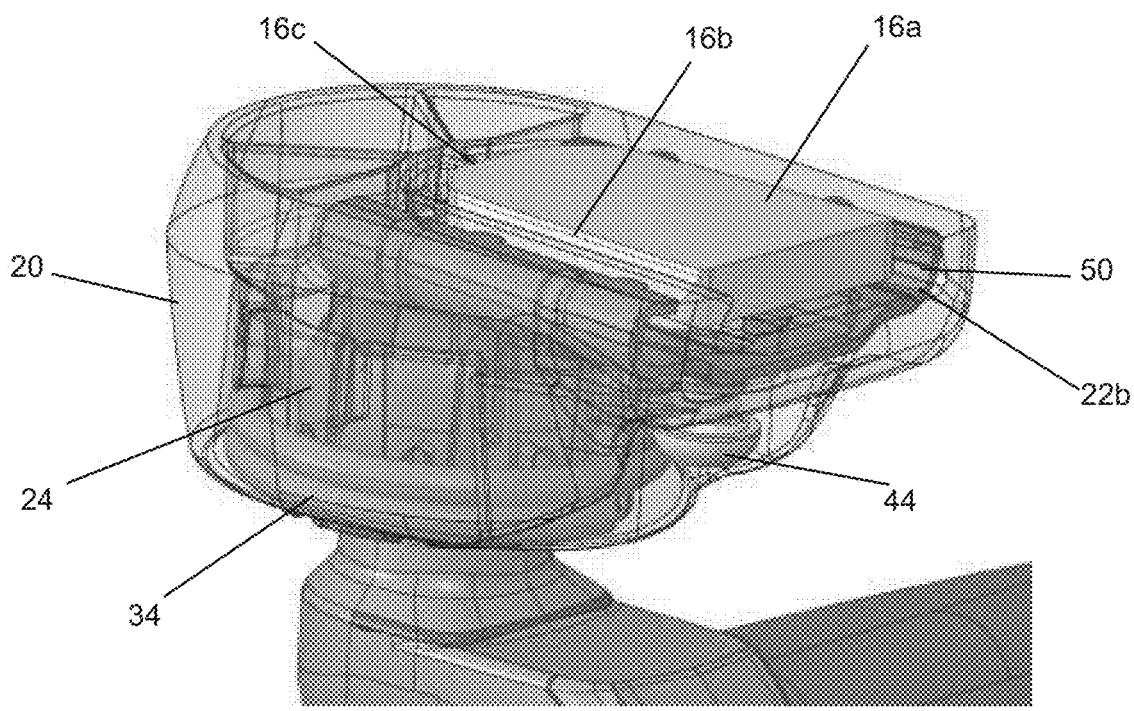
FIG. 11 is a perspective view of the mirror mount of FIG. 10, shown with a mirror button received at a button receiving portion of the mirror mount.
Figure 12:
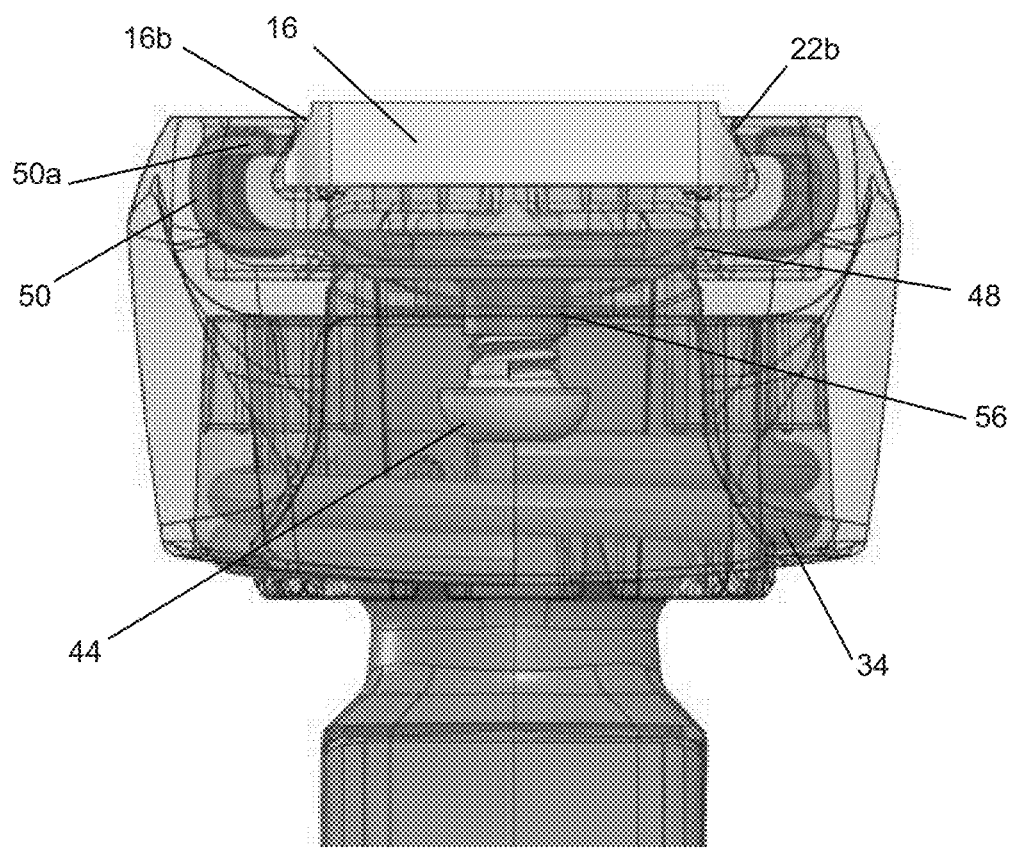
FIG. 12 is another view of the mirror mount and mirror button of FIG. 11.
Figure 13:
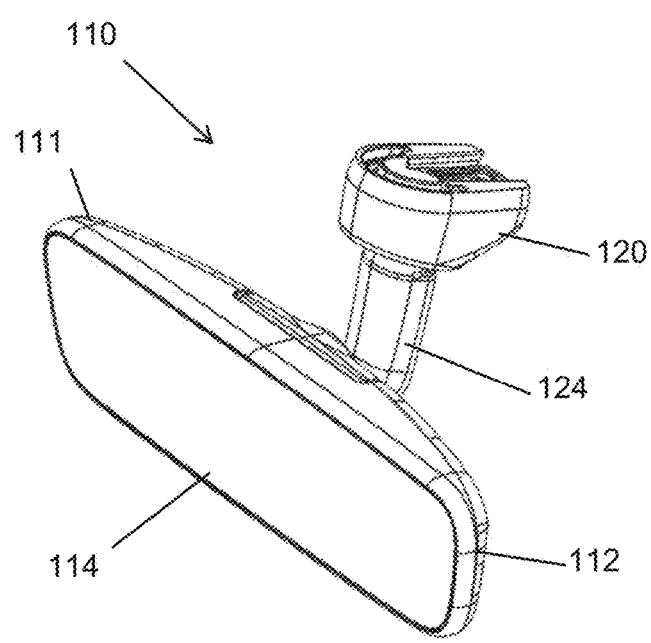
FIGS. 13-15 are views of another interior rearview mirror assembly with a double pivot joint mounting construction configured to attach at a mirror button for mounting at an interior portion of a vehicle.
Figure 14:
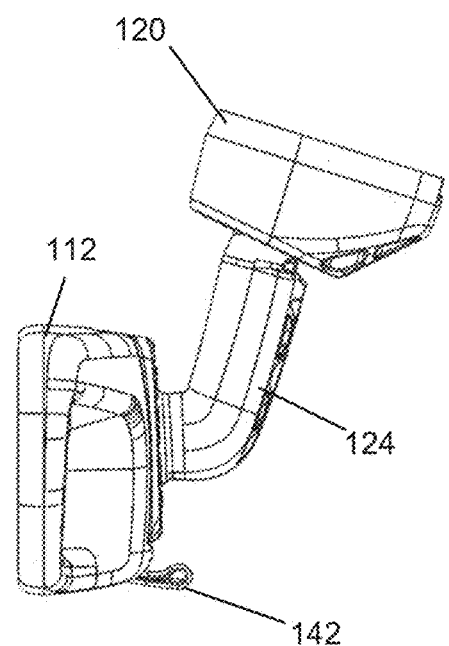
Figure 15:
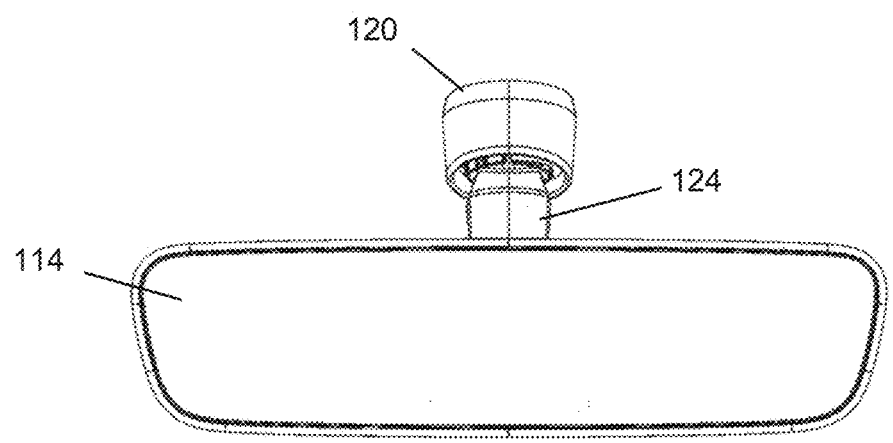
Figure 16:
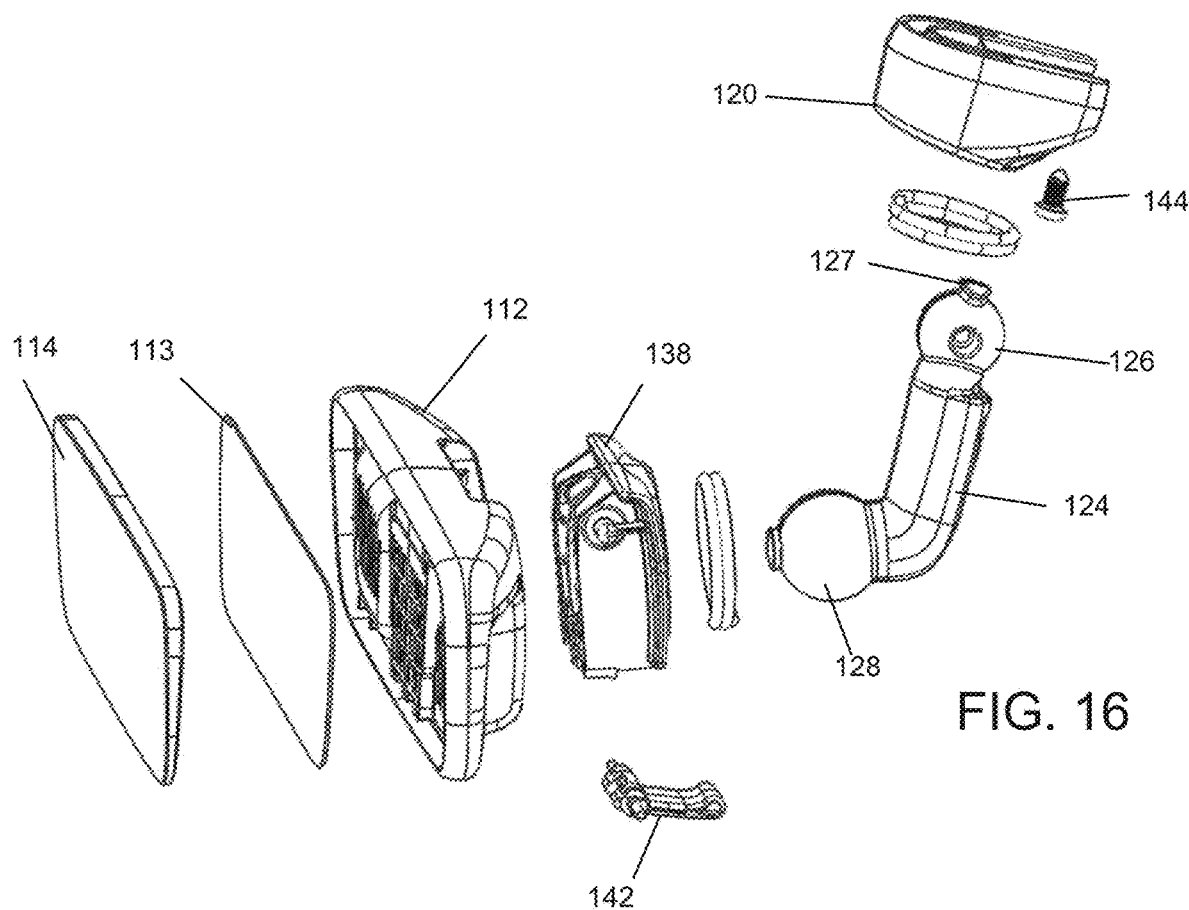
FIG. 16 is an exploded view of the interior rearview mirror assembly of FIGS. 13-15.
Figure 17:
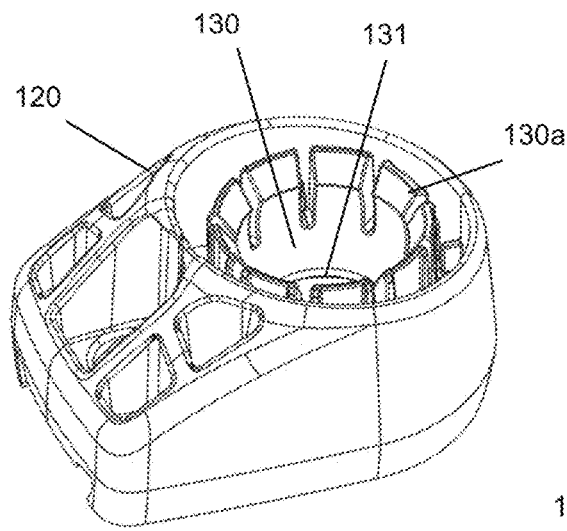
FIGS. 17 and 18 are perspective views of the mirror mount of FIGS. 13-15.
Figure 18:
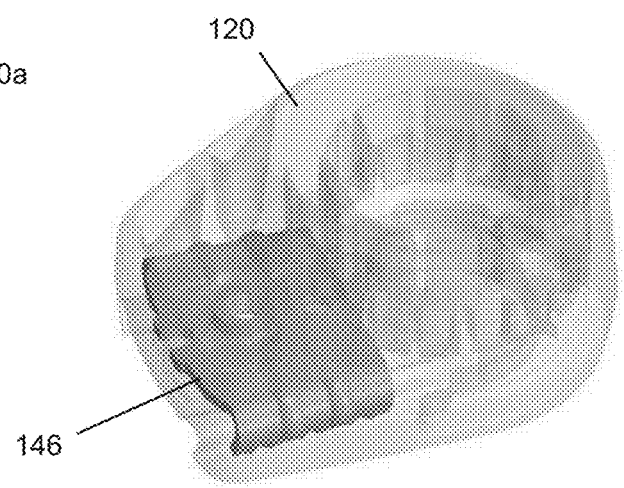

The metallic support structure 46 may be designed to also support stresses in the dove tail interface between the mirror mount 20 and the mirror button 16. As shown in FIGS. 11 and 12, the mirror mount 20 slidably engages the mirror button 16 at the button receiving portion 22 of the mirror mount. The button receiving portion 22 is defined by a recess or slot in the top surface 20a of the mirror mount 20 and inwardly angled side surfaces 22b along opposing sides of the slot. The inwardly angled side surfaces 22b provide receiving rails or guides for correspondingly angled side surfaces 16b of the mirror button 16. The corresponding angled relationship between the side surfaces of the button receiving portion and the mirror button form a dove tail joint so that the weight of the mirror mount (and attached mirror reflective element) is supported vertically by the mirror button. The curved arms or wings or lateral support tabs or receiving channels 50 of the metallic support structure 46 are integrally molded within the mirror mount 20 to align with and provide support at the dove tail joint.

The lateral support tabs 50 protrude upward from the base portion 48 within the body of the mirror mount 20 along the side surfaces 22b of the button receiving portion 22 and comprise inward facing curved or folded portions 50a that at least partially wrap around the angled side surfaces 22b. The support structure 46 is positioned within the body of the mirror mount 20 such that the top surface 22a of the button receiving portion 22 lies on a plane above the base portion 48 and below the top of the curved portion 50a so that the force from supporting the weight of the mirror mount and mirror assembly (and any other forces that may be felt at the mirror mount and/or mirror button) may be dispersed within the support structure, increasing the stability of the dove tail joint. Additionally, the metallic support structure helps resist dimensional changes and breaking or cracking of the mirror mount which can be caused by excessive force and/or thermal cycling. Thus, the metallic support structure will increase the dimensional stability of the dove tail joint through environmental and thermal changes which will reduce the risk of looseness that could occur from plastic relaxation and thermal expansion. Furthermore, the metallic support structure reduces the risk of detachment of the mirror mount from the windshield button when exposed to excessive forces (such as during ECE pendulum impact testing).

Once the mirror mount 20 slidably engages the mirror button 16 (such as to a point where the front rounded edge 16c of the mirror button aligns with or is stopped by the correspondingly rounded front edge 22c of the button receiving portion 22), the locking element or set screw 44 may be threaded into and through the mirror mount to retain the mirror mount at the mirror button and prevent the mirror mount from slidably detaching from the mirror button. As shown in the illustrated embodiment (such as FIGS. 11 and 12), the set screw 44 threadably engages the mirror mount and/or metallic support structure via the through hole 20c established in an outer lower surface of the mirror mount 20 and the threaded hole 54 through the metallic support structure. The set screw 44, when threaded into the threaded hole of the metallic support structure, may engage the mirror button 16 and provide a clamping force to press the mirror button into the side surfaces 22b of the button receiving portion.

The through hole 54 of the support structure 46 is formed through a screw engaging protrusion 56 at the base portion 48 that aligns with the through hole 20c established in the mirror mount. The support structure may be overmolded with the mirror mount in such a way that the internal surface of the support structure through hole and/or screw engaging protrusion is exposed to be threadably engaged with the set screw. Thus, the set screw may thread into the steel which is harder and more wear resistant than the glass filled POM material of the mirror mount. By reducing the stress in the threads, the steel support allows for increased set screw torque, which increases clamp load. That is, the steel support allows for higher torque to be applied to the fixing set screw, thereby increasing the clamp load between the mirror mount and the mirror button at the vehicle. This improves vibration performance and reduces the risk of noise caused by loose components, such as during buzz, squeak and rattle (BSR) testing. Additionally, threading into the steel allows for the majority of the clamp stress to be transferred through the steel support structure, further improving the structural integrity and stability of the connection between the mirror mount and mirror mounting button. Steel threads also allow for better durability during repeated installations as compared to threading the set screw into the plastic material of the mirror mount.

Although shown as a set screw, the locking mechanism may be any suitable element for engaging the mirror mount to retain the mirror mount at the mirror button. For example, the locking mechanism may be a clip or latch or biasing member at the button receiving portion that releasably engages the mirror button (such as to provide a quick release function of the mirror mount). Additionally, the steel support may have suitable elements to allow the base to detach from the windshield. For example, the support structure may comprise an outer surface or otherwise be an exterior component that provides an integrated locking mechanism (such as a biasing member), similar to elements discussed in U.S. Pat. No. 10,744,944, which is hereby incorporated herein by reference in its entirety.

Optionally, the mounting arm may comprise one or more anti-camout features so that, when the ball member of the mounting arm is received at the socket of the mirror mount, structure of the mounting arm and/or ball member may engage corresponding structure at the mirror mount and/or socket to preclude the mounting arm and ball member from pivoting beyond a point where the ball member may pull out of the socket. Thus, and as shown in FIGS. 13-25B, a vehicular interior rearview mirror assembly 110 may include a mirror head 111 (including a mirror reflective element 114 and mirror casing 112 where the mirror reflective element 114 may be adhesively attached at the mirror casing 112 via an adhesive element 113) that mounts at an interior portion of a vehicle via a mounting assembly 118. The mirror reflective element 114 comprises a prismatic mirror reflective element that is flipped between a daytime position and a nighttime position via a toggle element 142 that controls a toggle mechanism 138 that snap attaches at the mirror head 111. The mounting assembly 118 includes a mounting base or mirror mount 120 that attaches at an interior portion of the vehicle, such as at an in-cabin surface of a windshield of the vehicle, and a mounting arm 124. The mounting arm 124 includes a first ball member 126 that is pivotally received in a socket 130 of the mirror mount 120 and a second ball member 128 pivotally received at the mirror head 111 (such as at a socket 140 of the toggle mechanism 138).

As shown in FIGS. 16-20, the mirror mount 120 includes a socket 130 defined by inner surfaces of flexible tabs 130a. A recess 131 is formed at an upper inner surface of the socket 130. The first ball member 126 of the mounting arm 124 includes an anti-camout tab 127 protruding from an upper portion of the ball member 126 so that, when the first ball member 126 is received in the socket 130 of the mirror mount 120, the anti-camout tab 127 is received in the recess 131. The anti-camout tab 127 and recess 131 are configured so that, when the mounting arm 124 and mirror head 111 are pivoted to a maximum pivot position (FIGS. 19A, 19B, and 20), the anti-camout tab 127 of the ball member 126 may engage a surface of the mirror mount 120 defining the recess 131. In other words, the inner surface of the mirror mount 120 defining the recess 131 may define the maximum pivot positions of the mounting arm 124 and mirror head 111.

Figures 19, 19A:
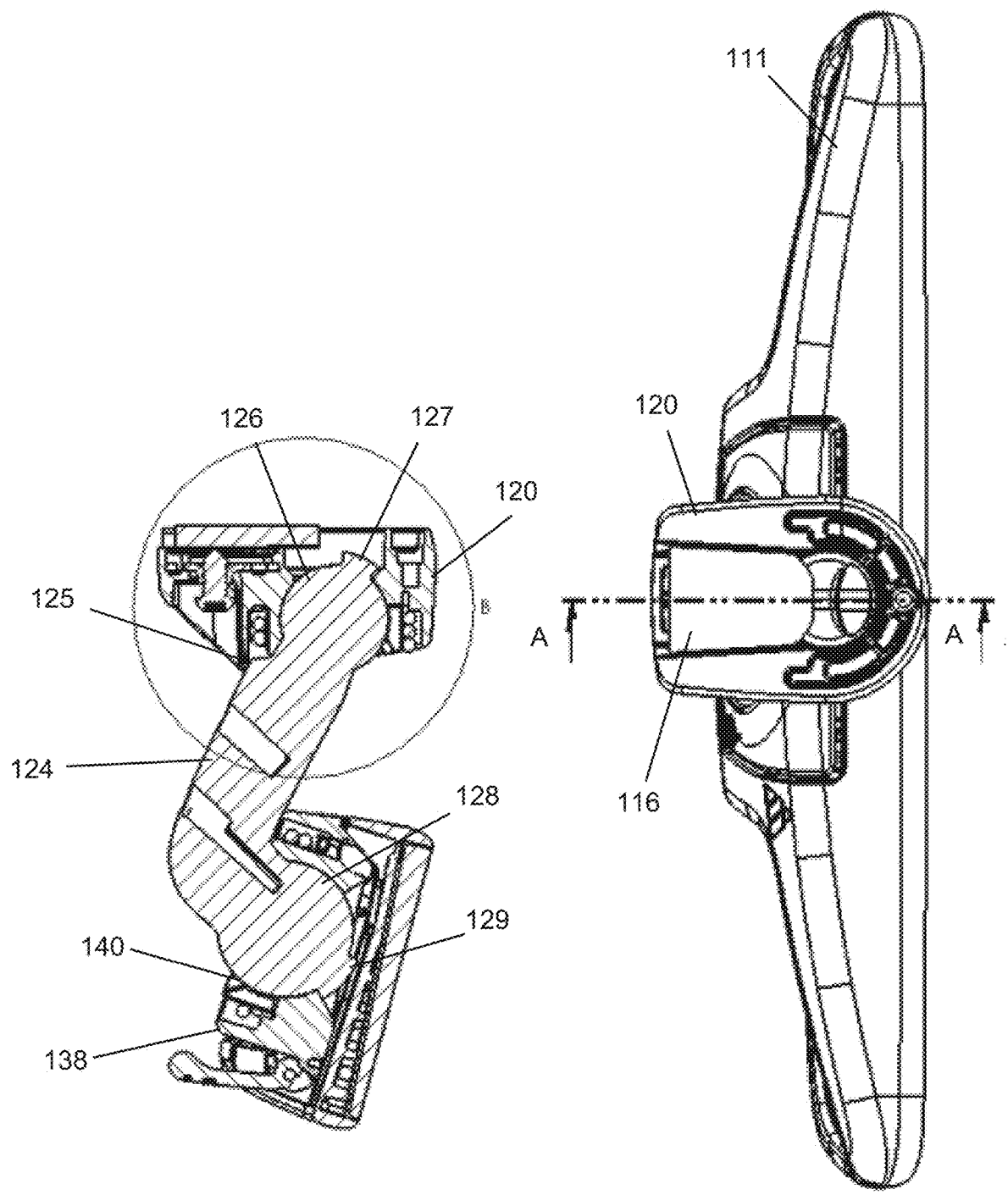
FIG. 19 is a top view of the interior rearview mirror assembly of FIGS. 13-15.
FIG. 19A is a cross-sectional view taken along Line A-A of FIG. 19.
Figure 19B:
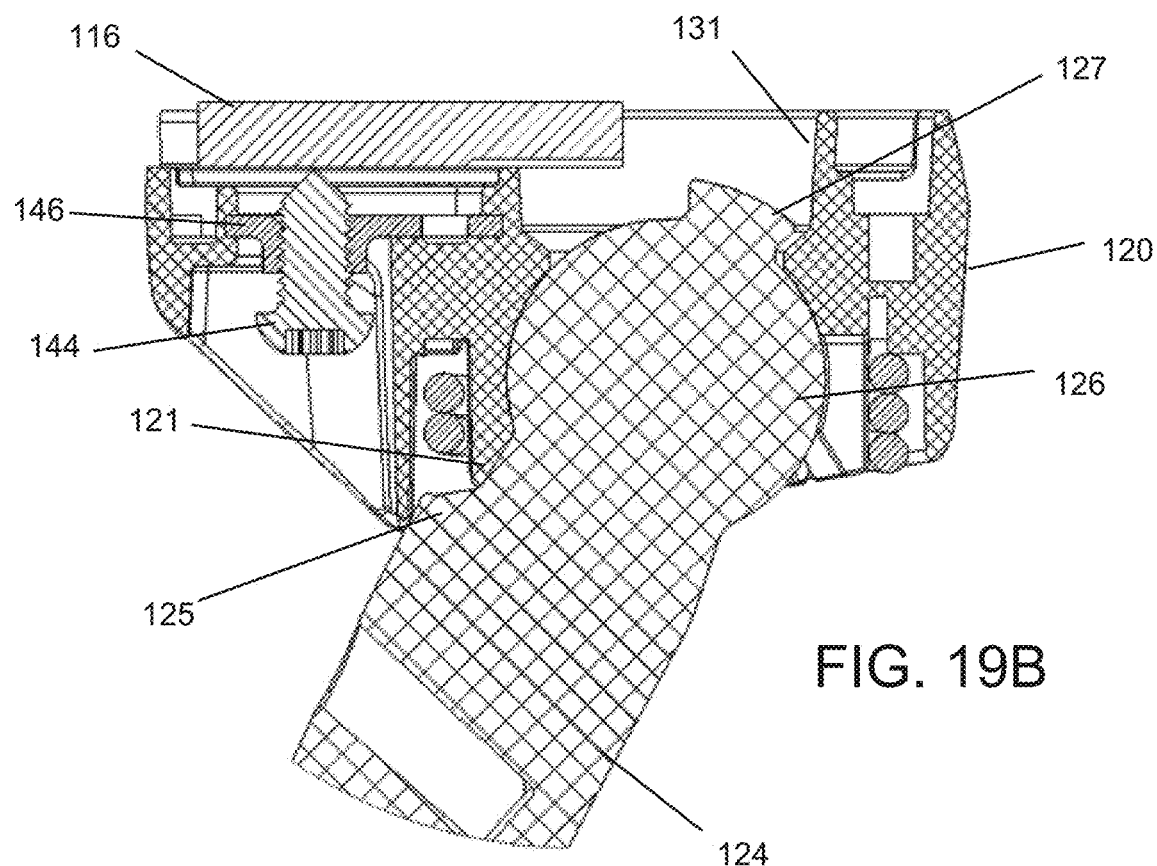
FIG. 19B is an enlarged view of Portion B of FIG. 19A.
Figure 20:
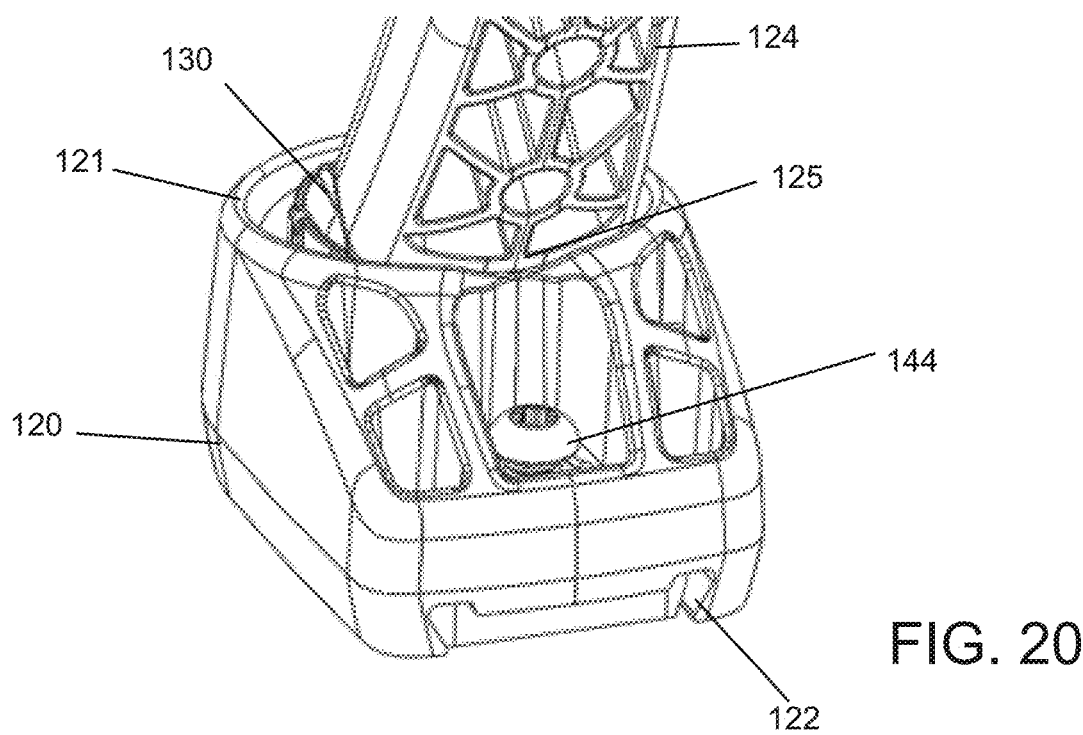
FIG. 20 is a perspective view of the mounting arm received in the mirror mount and pivoted to a maximum pivot position.

Optionally, and such as shown in FIGS. 19B and 20, the mounting arm 124 may be configured to engage corresponding structure of the mirror mount 120 at a maximum pivot position that is less than the maximum pivot position defined by the anti-camout tab 127 and recess 131. In other words, when the mirror head 111 and the mounting arm 124 are pivoted towards the maximum pivot position, the mounting arm 124 may engage a portion of the mirror mount 120 before the anti-camout tab 127 engages the inner surface of the recess 131. For example, the mounting arm 124 may include an extension or shelf 125 at the end of the mounting arm 124 nearest the first ball member 126 and the shelf 125 may be configured to engage a lip 121 of the mirror mount 120 surrounding the socket 130 and raised relative to the outer edge of the socket 130. The anti-camout tab 127 may then engage the inner surface of the recess 131 if the load applied at the lip 121 deforms or bends the lip 121 and the mounting arm 124 pivots further past the maximum pivot position.

That is, when load is applied to the mirror assembly and the mounting arm 124 reaches the end of travel (i.e., the maximum pivot position), stress is transferred to the supporting surface of the lip 121 of the mirror mount 120. If the load applied increases beyond a certain threshold to cause enough elastic deformation, the anti-camout feature 127 on the ball member 126 makes contact with the mirror mount 120 within the recess 131. At this point, the stress is distributed between the lip 121 and the recess 131 to optimize the load carrying capacity in each location such that material failure is avoided.

Optionally, the second ball member 128 of the mounting arm 124 that is received at a socket 140 of the mirror head 111 or toggle mechanism 138 may similarly include an anti-camout tab 129 protruding from an outer surface of the ball member 128. The anti-camout tab 129 of the second ball member 128 may engage corresponding structure of the mirror head 111 to preclude pivotal movement of the ball member 128 beyond where the anti-camout tab 129 engages the structure at the socket 140 of the mirror head 111.

Figure 21:
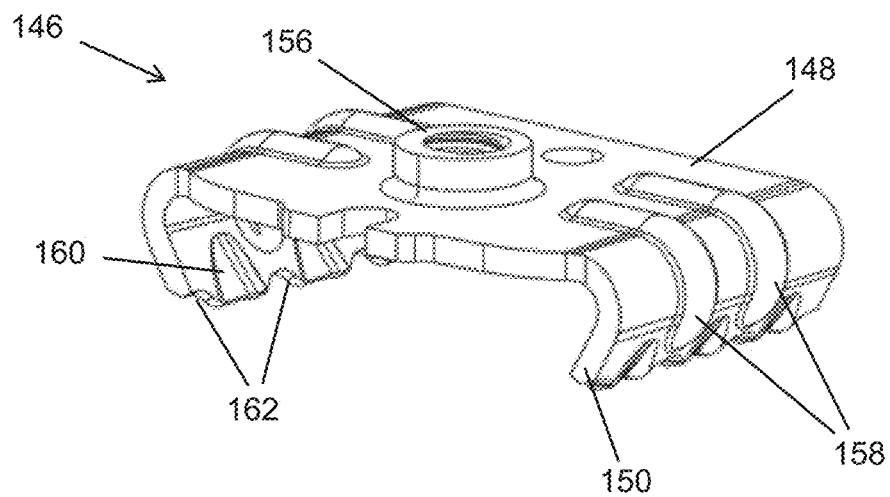
FIGS. 21-23 are perspective views of the metallic support structure of the mirror mount of FIGS. 13-15.
Figure 22:
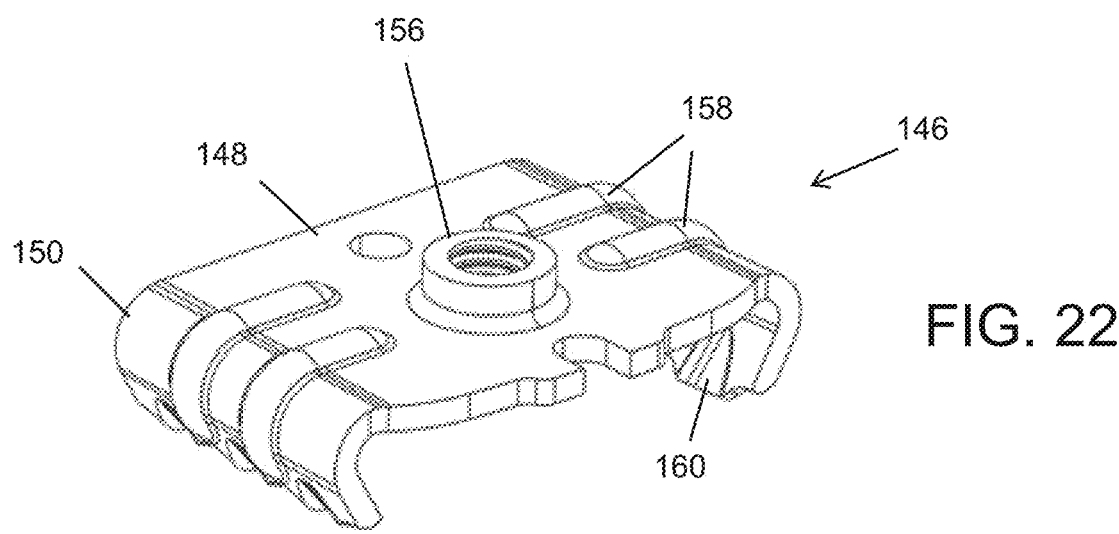
Figure 23:
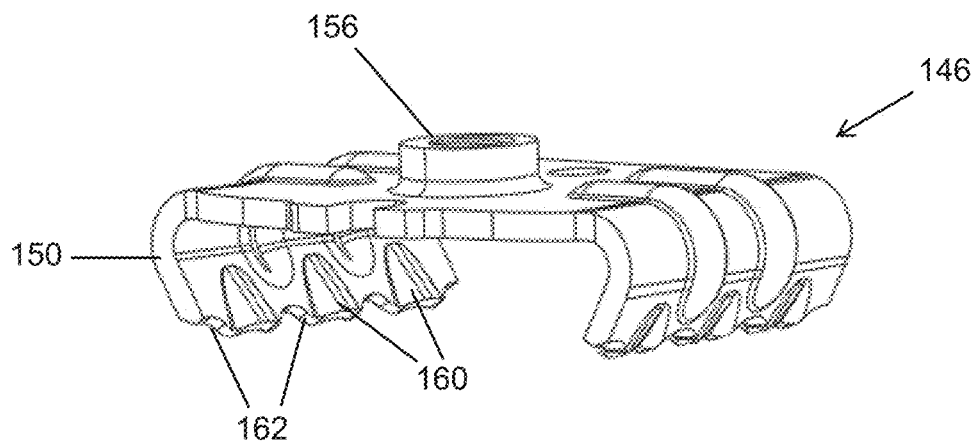
Figures 25, 25A, 25B:
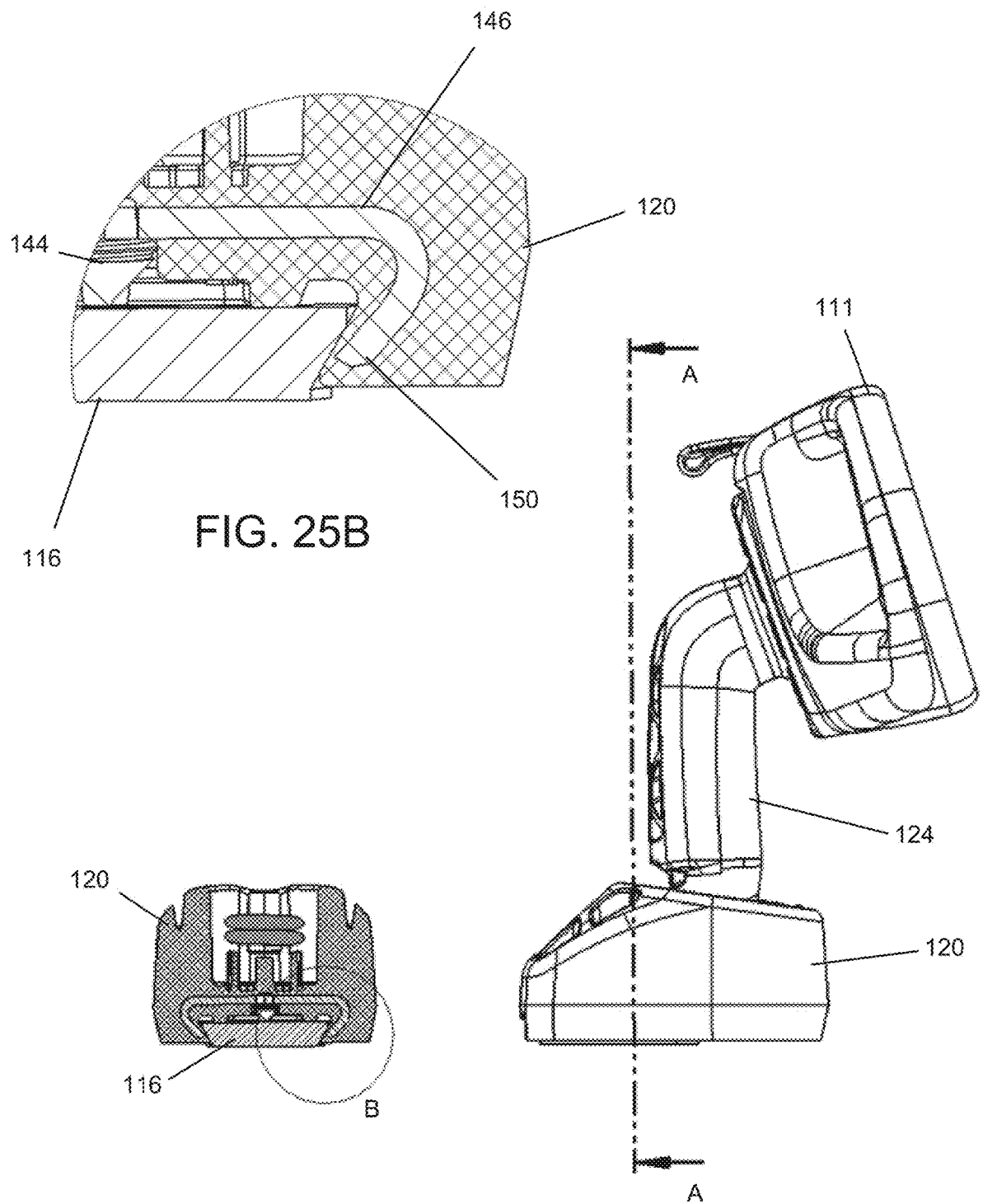
FIG. 25 is a side view of the interior rearview mirror assembly of FIGS. 13-15.
FIG. 25A is a cross-sectional view taken along Line A-A of FIG. 25.
FIG. 25B is an enlarged view of Portion B of FIG. 25A.

As shown in FIGS. 21-25B, the mirror mount 120 includes a metallic support structure 146 within a body of the mirror mount 120 such that the metallic support structure may be overmolded by the unitary plastic element of the mirror mount 120. The metallic support structure 146 provides rigid support to the button receiving portion 122 of the mirror mount (that receives the mirror button 116 adhesively attached at the windshield of the vehicle to mount the mirror mount 120 at the mirror button 116). As shown in FIGS. 21-23, the metallic support structure includes a substantially flat base portion 148 and curved arms or rails 50 extending along opposite edges of the base portion 148. The curved arms 50 are configured to extend along opposing angled side walls of the button receiving portion 122 to provide support to the dove tail interface between the mirror mount 120 and the mounting button 116.

The metallic support structure 146 is also configured to receive a locking mechanism, such as a threaded set screw 144, for retaining the mirror mount 120 at the mounting button 116. The metallic support structure 146 includes a screw engaging protrusion 156 extending from the base portion 148 and including a threaded through hole that threadably receives the set screw 144. The screw engaging protrusion 156 may be 43598732.1 exposed exterior the body of the mirror mount 120 for receiving the set screw 116 while the remaining portion of the metallic support structure 146 is contained within the body of the mirror mount 120. Thus, the set screw 116 directly engages the metallic support structure 146. Optionally, the set screw 116 may threadably engage the metallic support structure 146 and pass through the metallic support structure 146 to engage the mirror button 116 at the button receiving portion 122 of the mirror mount 120. That is, the set screw 144 threads directly into the metallic support structure 146, distributing stress caused by tightening the set screw into the metallic support structure 146. Threading into the metallic support structure 146 improves thread life for serviceability.

When the locking mechanism 144 engages the metallic support structure 146, the clamp load applied between the locking mechanism and mounting button 116 is dispersed through the metallic support structure 146 instead of the mirror mount 120 to limit or preclude stress and deformation of the plastic mirror mount 120 and more securely retain the mirror mount at the mounting button 116. The metallic support structure includes structural supports or embossments 158 at an outer surface of the support structure 146 and spanning at least a portion of the base portion 148 and support rails 150 to preclude outward flexing of the support rails 150. The embossments 158 wrap around the bend in the metal to improve stiffness of the metallic support structure 146. The extra stiffness allows higher torque to be applied to the set screw 144 without damaging the mount 120 or mount support structure 146 and reducing the elastic deformation of the mounting interface.

Additionally, dimples or divots 160 may be formed at an inner surface of the metallic support structure 146 along the respective edges of the support rails 150. The dimples 160 may allow for plastic to flow more easily around the metallic support structure 146 during the manufacturing process, allowing for a thinner layer of plastic between the metallic support structure 146 and the mirror button 116. Furthermore, recesses or indentations 162 may be formed along the respective edges of the support rails 150 (such as between each of the dimples 160) to provide a non-linear or wavy edge of the support rails 150.

In other words, the edge of the metal support structure 146 is formed to improve clearance to the injection molding tool steel and allowing plastic to flow more easily. The features on the metallic support structure 146 are designed to reduce the thickness of 43598732.1 plastic between the windshield button 116 and the metallic support structure 146. This reduces the loosening effects that can result from thermal expansion and contraction. Keeping the plastic thickness between the metallic support structure 146 and the windshield button 116 small also reduces the effects that dimensional creep could have on loosening and vibration performance. The features on the metallic support structure 146 are designed to provide multiple points of contact between the mirror mount 120 and the windshield button 116, but also allow plastic to easily flow around the metallic support structure 146 during the injection molding process by only locally reducing the plastic thickness. Thus, the metallic support structure 146 provides improved stiffness and durability to the mounting interface between the mirror mount 120 and the mounting button 116. The stiffness provided by the metallic support structure 146 reduces stress in the sharp corner of the dove tail mounting slot allowing higher screw torques to be applied without damaging the plastic mount. The added stiffness also allows more load to be applied to the mounted assembly without the mirror unintendedly detaching from the windshield during normal use.

The toggle mechanism may snap attach at the mirror casing and thus may enable quick and easy installation of the mounting assembly to the mirror casing. The toggle mechanism controls flipping of the prismatic mirror reflective element between the daytime position and the nighttime position via the toggle element and receives the mounting arm at the socket of the toggle mechanism. The socket receives the second ball member of the mounting arm in a similar manner as to how the socket receives the first ball member. However, it should be understood that the second ball member of the mounting arm may be received in any suitable manner at the mirror casing or the mounting arm may be fixed or otherwise attached at the mirror casing. For example, the mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

The mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

The mirror reflective element may attach at a backplate within or comprising the mirror casing where the backplate may comprise any suitable construction. Optionally, for example, a common or universal backplate may be provided, whereby the appropriate or selected socket element or pivot element (such as a socket element or such as a ball element or the like) is attached to the backplate to provide the desired pivot joint for the particular mirror head in which the backplate is incorporated. Optionally, when molding the backplate, a different insert may be provided to integrally mold a portion of or all of a ball member or the like (such as a portion of a base of a ball member, whereby the ball member may comprise a metallic ball member that is insert molded at the base and at the rear of the backplate during the injection molding process that forms the backplate, such as by utilizing aspects of the mirror assemblies described in U.S. Pat. Nos. 7,855,755; 7,249,860 and 6,329,925 and/or U.S. Pat. Pub. No. US-2006-0061008, which are hereby incorporated herein by reference in their entireties).

The reflective element and mirror casing are adjustable relative to a base portion or mounting assembly to adjust the driver's rearward field of view when the mirror assembly is normally mounted at or in the vehicle. The sockets and ball members of the mounting structure may utilize aspects of the pivot mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. Publication No. US-2018-0297526, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:

a mounting assembly comprising a mirror mount and a mounting arm, wherein the mirror mount is configured to mount at a mirror mounting button adhesively attached at an in-cabin side of a windshield of a vehicle equipped with the vehicular interior rearview mirror assembly;

wherein the mirror mount slidably engages the mirror mounting button to attach the mirror mount at the in-cabin side of the windshield of the vehicle;

a mirror head comprising a mirror reflective element;

wherein the mounting arm has a first end and a second end distal from the first end;

wherein the first end of the mounting arm is pivotally attached at the mirror mount via a first pivot joint;

wherein the mirror head is attached at the second end of the mounting arm;

wherein the first pivot joint comprises a ball member at the first end of the mounting arm pivotally received in a socket element of the mirror mount;

wherein the mirror mount comprises an anti-camout element protruding from an interior surface of the socket element, and wherein the anti-camout element is at least partially received in a recess of the ball member to limit pivotal movement of the ball member within the socket element when the ball member engages the anti-camout element;

wherein the mirror mount comprises a metallic support element forming at least a portion of the anti-camout element;

wherein the metallic support element is disposed within a plastic body portion of the mirror mount, and wherein the metallic support element comprises a base portion and a support tab protruding from the base portion;

wherein the base portion of the metallic support element is disposed at a receiving portion of the plastic body portion of the mirror mount;

wherein the receiving portion, when the mirror mount is mounted at the mirror mounting button, slidably engages the mirror mounting button; and wherein the support tab of the metallic support element is disposed within a plastic portion of the anti-camout element, and wherein the support tab of the metallic support element provides a core portion of the anti-camout element.

2. The vehicular interior rearview mirror assembly of claim 1, wherein the metallic support element is overmolded within the plastic body portion of the mirror mount and wherein the support tab is overmolded within the plastic portion of the anti-camout element.

3. The vehicular interior rearview mirror assembly of claim 1, wherein the receiving portion of the plastic body portion of the mirror mount comprises angled side surfaces that are configured to receive correspondingly angled side surfaces of the mirror mounting button, and wherein the metallic support element comprises lateral support tabs protruding from opposite edges of the base portion of the metallic support element and disposed along the respective angled side surfaces of the receiving portion of the plastic body portion of the mirror mount.

4. The vehicular interior rearview mirror assembly of claim 1, further comprising a locking element which, with the mirror mount mounted at the mirror mounting button, engages the mirror mount and the mirror mounting button to retain the mirror mount at the mirror mounting button.

5. The vehicular interior rearview mirror assembly of claim 4, wherein the locking element comprises a set screw that threadably engages a through hole established in the base portion of the metallic support element.

6. The vehicular interior rearview mirror assembly of claim 5, wherein the through hole of the metallic support element is axially aligned with a through hole established in the mirror mount, and wherein the set screw extends through the through hole of the mirror mount and threadably engages the through hole of the metallic support element.

7. The vehicular interior rearview mirror assembly of claim 1, wherein the mirror head is pivotally attached at the second end of the mounting arm via a second pivot joint.

8. The vehicular interior rearview mirror assembly of claim 1, wherein the mirror mount comprises a flexible lip that at least partially circumscribes the socket element to limit movement of the mounting arm and ball member relative to the mirror mount when the mounting arm engages the flexible lip.

9. The vehicular interior rearview mirror assembly of claim 8, wherein, when the mounting arm initially engages the flexible lip as the mounting arm pivots relative to the mirror mount via the first pivot joint, the ball member does not engage the anti-camout element and, when the mounting arm is further pivoted so that the mounting arm is further moved into engagement with the flexible lip, the flexible lip flexes to allow further movement of the mounting arm and ball member relative to the mirror mount until the ball member engages the anti-camout element.

10. The vehicular interior rearview mirror assembly of claim 1, wherein the plastic body portion of the mirror mount is overmolded over the base portion of the metallic support element, and wherein the metallic support element is disposed within the receiving portion of the plastic body portion.

11. The vehicular interior rearview mirror assembly of claim 10, wherein the base portion of the metallic support element, when the mirror mount is mounted at the mirror mounting button, is spaced from the mirror mounting button.

12. A vehicular interior rearview mirror assembly, the vehicular interior rearview mirror assembly comprising:

a mounting assembly comprising a mirror mount and a mounting arm, wherein the mirror mount is configured to mount at a mirror mounting button adhesively attached at an in-cabin side of a windshield of a vehicle equipped with the vehicular interior rearview mirror assembly;

wherein the mirror mount slidably engages the mirror mounting button to attach the mirror mount at the in-cabin side of the windshield of the vehicle;

a mirror head comprising a mirror reflective element;

wherein the mounting arm has a first end and a second end distal from the first end;

wherein the first end of the mounting arm is pivotally attached at the mirror mount via a first pivot joint;

wherein the mirror head is attached at the second end of the mounting arm;

wherein the first pivot joint comprises a ball member at the first end of the mounting arm pivotally received in a socket element of the mirror mount;

wherein the mirror mount comprises a plastic element overmolded over a metallic support element, and wherein the metallic support element comprises a base portion and a support tab protruding from the base portion;

wherein the base portion of the metallic support element is disposed at a receiving portion of the plastic element of the mirror mount;

wherein the receiving portion, when the mirror mount is mounted at the mirror mounting button, slidably engages the mirror mounting button;

an anti-camout element at the first pivot joint that limits pivotal movement of the ball member within the socket element when the anti-camout element is engaged;

wherein the anti-camout element protrudes from an interior surface of the socket element, and wherein the anti-camout element is at least partially received in a recess of the ball member to limit pivotal movement of the ball member within the socket element when the ball member engages the anti-camout element;

wherein the support tab of the metallic support element is disposed within a plastic portion of the anti-camout element, and wherein the support tab of the metallic support element provides a core portion of the anti-camout element;

wherein the mirror mount comprises a flexible lip that at least partially circumscribes the socket element to limit movement of the mounting arm and ball member relative to the mirror mount when the mounting arm engages the flexible lip; and wherein, when the mounting arm initially engages the flexible lip as the mounting arm pivots relative to the mirror mount via the first pivot joint, the anti-camout element is not engaged to limit pivotal movement of the ball member within the socket element, and when the mounting arm is further pivoted so that the mounting arm is further moved into engagement with the flexible lip, the flexible lip flexes to allow further movement of the mounting arm and ball member relative to the mirror mount until the anti-camout element is engaged.

13. The vehicular interior rearview mirror assembly of claim 12, wherein the plastic element of the mirror mount is overmolded over the base portion of the metallic support element, and wherein the metallic support element is disposed within the receiving portion of the plastic element.

14. The vehicular interior rearview mirror assembly of claim 13, wherein the base portion of the metallic support element, when the mirror mount is mounted at the mirror mounting button, is spaced from the mirror mounting button.

* * * * *

UNITED STATES PATENT AND TRADEMARK OFFICE
CERTIFICATE OF CORRECTION

| | | |
|---|---|---|
| PATENT NO. | : 12,405,443 B2 | Page 1 of 1 |
| APPLICATION NO. | : 17/659849 | |
| DATED | : September 2, 2025 | |
| INVENTOR(S) | : Kurtis M. Larson et al. | |

It is certified that error appears in the above-identified patent and that said Letters Patent is hereby corrected as shown below:

In the Specification

<u>Column 9</u>
Line 44, "may be 43598732.1 exposed" should be --may be exposed--

<u>Column 10</u>
Line 23, "thickness of 43598732.1 plastic" should be --thickness of plastic--

Signed and Sealed this
Twenty-first Day of October, 2025

John A. Squires
*Director of the United States Patent and Trademark Office*